(12) United States Patent
Schlicht

(10) Patent No.: US 6,276,727 B1
(45) Date of Patent: Aug. 21, 2001

(54) SLIP-ON COMPRESSION COUPLING FOR THERMOPLASTIC PIPE

(76) Inventor: Gunter Schlicht, 15 Briones View, Orinda, CA (US) 94563

( * ) Notice: Subject to any disclaimer, the term of this patent is extended or adjusted under 35 U.S.C. 154(b) by 0 days.

(21) Appl. No.: 09/369,491

(22) Filed: Aug. 5, 1999

(51) Int. Cl.[7] .................................................. F16L 19/00
(52) U.S. Cl. ............................................ 285/371; 285/398
(58) Field of Search .................................. 285/371, 372, 285/398

(56) References Cited

U.S. PATENT DOCUMENTS

| | | | |
|---|---|---|---|
| 2,462,721 | * | 2/1949 | Cohen . |
| 2,814,508 | * | 11/1957 | Seamark . |
| 3,101,208 | * | 8/1963 | Clifford et al. . |
| 4,236,736 | * | 12/1980 | Anderson . |
| 4,865,356 | * | 9/1989 | Moore et al. . |

* cited by examiner

*Primary Examiner*—Teri Pham Luu
(74) *Attorney, Agent, or Firm*—Richard Esty Peterson, Patent Attorney

(57) ABSTRACT

A mechanical pipe coupling for thermoplastic pipe, the coupling including an outer sleeve with cuff portions at opposite open ends and an internally directed flaring, the sleeve having a central circumferential ridge between the cuff portions, the coupling also including a plurality of compression shoes with adjustment screws, with the compression shoes engaging the inside of the ends of the pipe and clamping the pipe against the inside of the sleeve.

9 Claims, 2 Drawing Sheets

SLIP-ON COMPRESSION COUPLING FOR THERMOPLASTIC PIPE

BACKGROUND OF THE INVENTION

This invention relates to a pipe connector and in particular to a slip-on compression coupling for thermoplastic pipe. Thermoplastic pipe has become popular for many industrial and agricultural uses, particularly for installations where the pipe is frequently moved, or must be installed to convey abrasive or corrosive substances.

For example, in the mining industry, thermoplastic pipe is remarkably durable for transporting abrasive slurries in the processing of ores. When removing or depositing slurries, the piping must frequently be moved to optimize transport of this bulk material. Additionally, sections of the piping must occasionally be replaced, when the inner walls of the pipe began to wear thin. A pipe coupling that can be easily installed in the field to couple severed ends of thermoplastic pipe is advantageous. When this interconnection is accomplished with a mechanical coupling device, without chemical or thermal bonding, the task is simplified. Additionally, use of a mechanical coupling can permit the interconnection of pipe segments during rain or inclement weather where thermal coupling is not possible. It is therefore a principal object of this invention to provide a coupling device for thermoplastic pipe that interconnects pipe ends mechanically. The pipe coupling invented utilizes an internal compressive clamping force to interconnect an external coupler sleeve to the ends of thermoplastic pipe. The coupling can be used in irrigation or wastewater treatment projects, in chemical plants, processing industries or other conventional environments wherever thermoplastic pipe is used.

SUMMARY OF THE INVENTION

The slip-on compression coupling of this invention is designed for use with thermoplastic pipe. The compression coupling is designed to interconnect the ends of thermoplastic by a clamping force that causes a cold flow in the end segments of the interconnected pipe which seals the pipe and coupling and minimizes any interference with the rated flow capacity of the pipe.

The compression coupling of this invention slips over the butted ends of the thermoplastic pipe. A series of contoured compression shoes, each connected to an adjustment screw are positioned around the inside circumference of the pipe ends. The compression shoes span the end segments of the pipe. The butted pipe ends are spaced to permit the compression screws to be mounted through an outer sleeve of the coupling. External rotation of the screws results in adjustment of the shoes.

The compression shoes are contoured to the configuration of the flared end segments of the pipe after the end segments are flared upon tightening of the screws. Preferably, both the contact surface of the shoes and the inner contacting surface of the opposite cuff portion of the sleeve are grooved with a concentric saw tooth grooving. The series of groovings acts both as a labyrinth seal and a frictional grip for the thermoplastic pipe. The pipe deforms by cold flow to conform with the grooving, and the internal flaring of the sleeve on tightening of the adjustment screws. The end segments of the thermoplastic pipe are compressed between the compression shoes and the inner contacting surface. The cold flow displacement of the pipe against the internal flaring of the cuff portions of the sleeve allows positioning of the compression shoes after tightening, without reducing the effective inside diameter of the coupled conduit at the coupling.

The coupling of this invention is designed for thermoplastic pipe and other plastic-type pipe that has at least a limited elastic or cold flow deformability to effect sealing between the sleeve and pipe.

These and other features of this invention will become apparent from a consideration of detailed description of the preferred embodiment that follows.

DETAILED DESCRIPTION OF THE PREFERRED EMBODIMENTS

Figure 1:
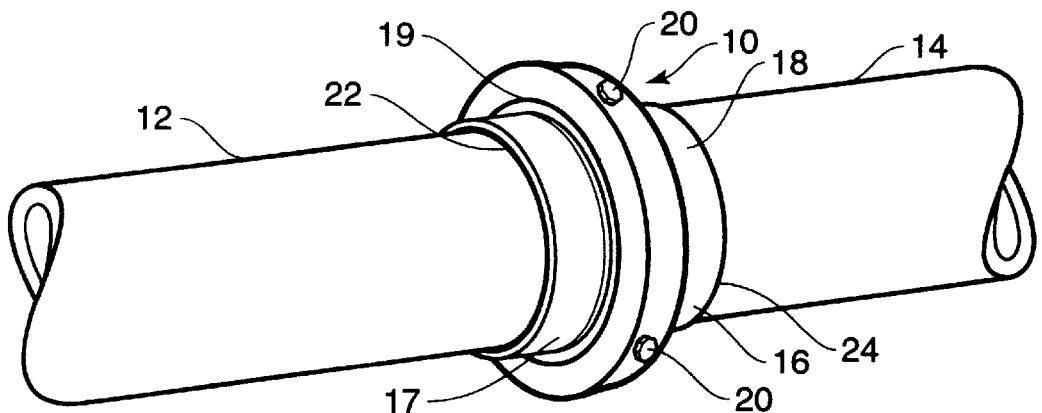
FIG. 1 is a perspective view of the invented coupling installed on segments of pipe.

FIG. 1 is a perspective view of the coupling of this invention, designated generally by the reference numeral 10, installed on segments of pipe, 12 and 14. The coupling 10 includes an outer sleeve 16 with two cuff portions 17 and 18, and a central peripheral ridge 19 that circles the coupling and provides a seat for a series of adjustment bolts 20. The segments of pipe, 12 and 14 are fabricated of a thermal plastic composition with end segments 22 and 24 joined by the mechanical coupling 10.

Figure 3:
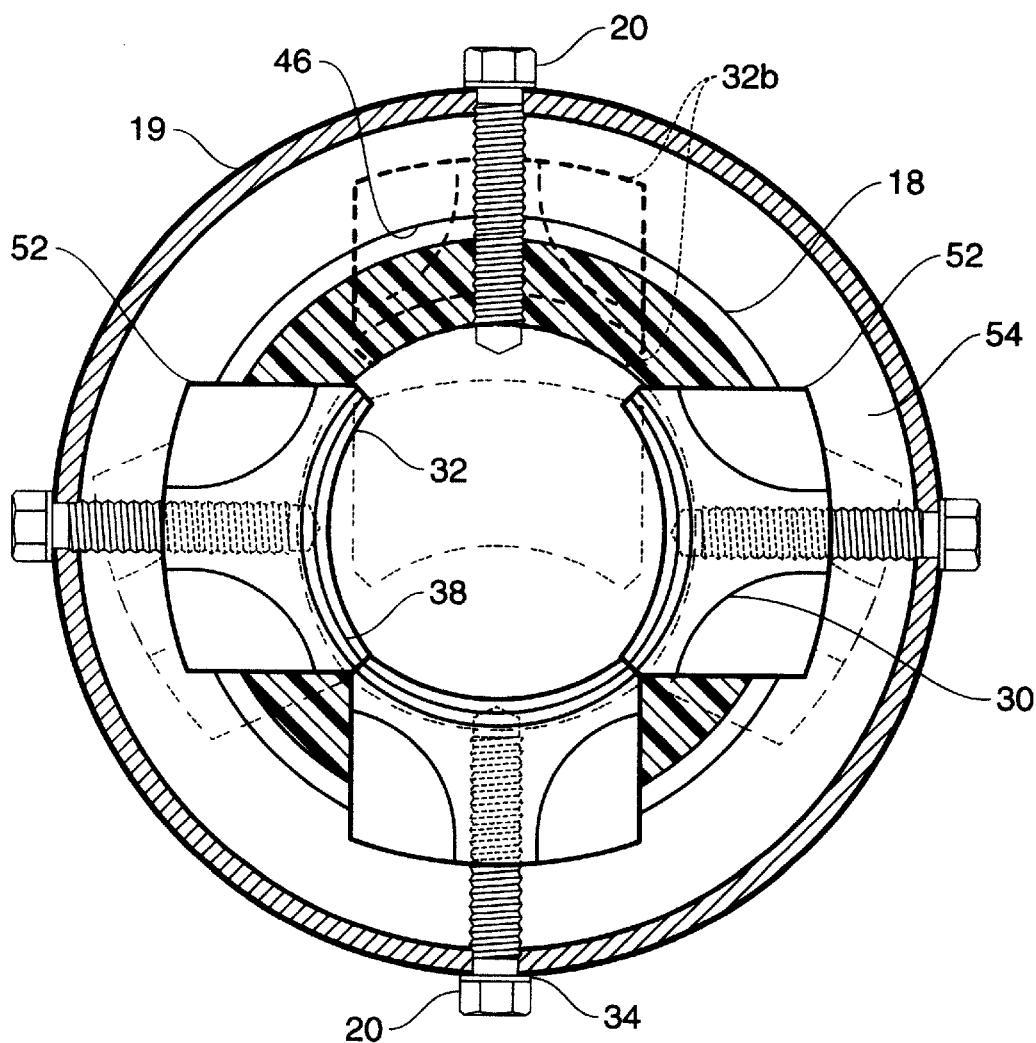
FIG. 3 is a cross sectional view of the coupling and segments of pipe taken on the lines 3—3 in FIG. 2.
Figure 2:
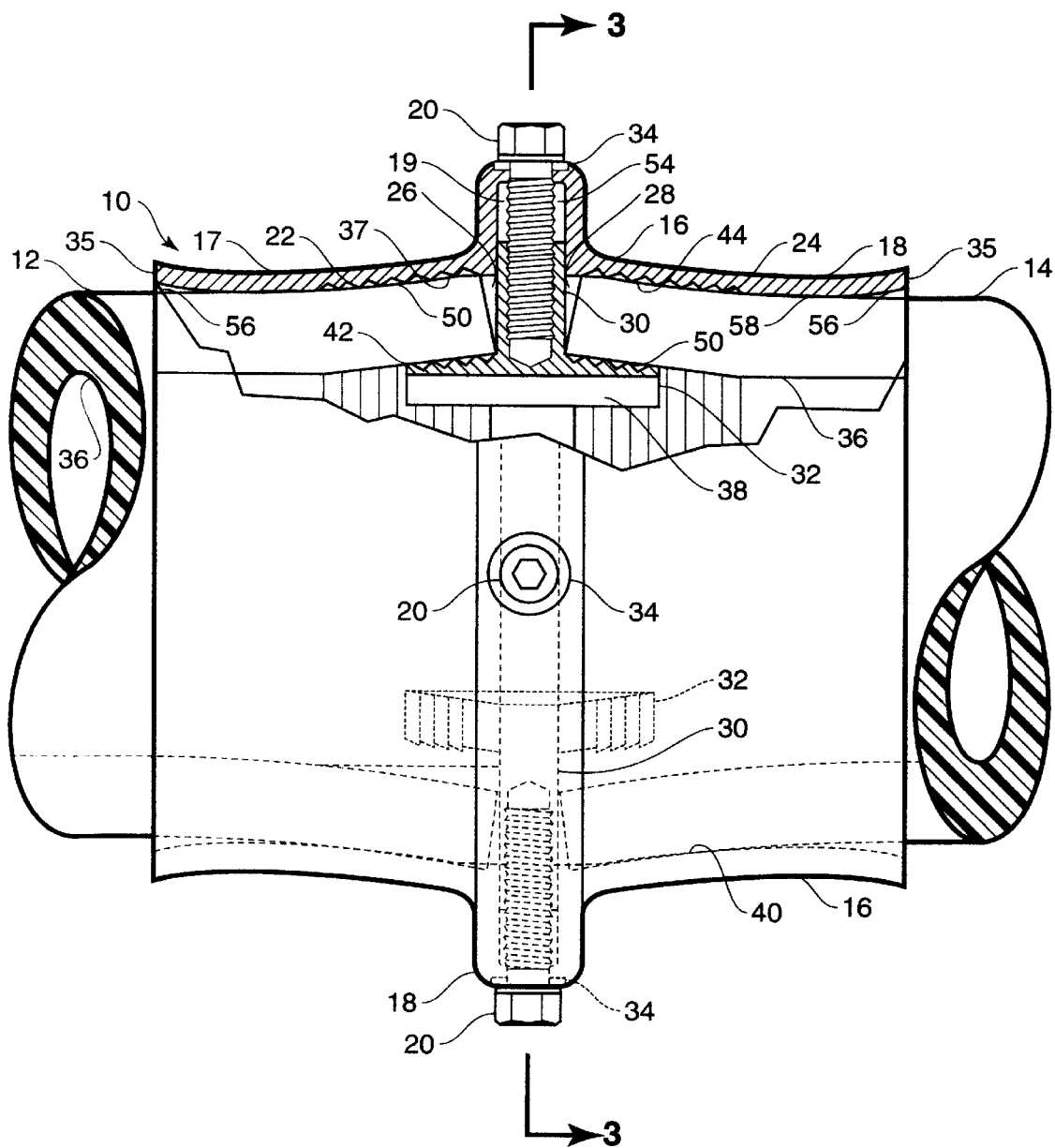
FIG. 2 is an enlarged side elevational view, partially broken-away in cross section, of the pipe coupling and segments of pipe of FIG. 1

Referring to FIGS. 2 and 3, the internal construction of the coupling 10 can be described. In FIG. 2, end segments 22 and 24 of the pipe 12 and 14 are inserted into the cuff portions 17 and 18 of the sleeve 16 of the coupling 10 until the ends, 26 and 28 contact the shoulder 30 of compression shoes 32. During installation, the shoes 32 are positioned within the inner circumference of the pipe, as shown in the phantom example in FIG. 2. The shoes 32 are connected to the adjustment screws 20 which project through the sleeve 16 and seat on the central ridge 19 on gasket washers 34. The screws 20 are socket screws to provide a cylindrical engagement surface to the gasket washers. Each cuff portion 17 and 18 of the sleeve 16 has an open end 35 with an internally directed flaring 37 that comprises the engagement surface for the end segments of the pipe when flared.

In the embodiment of FIGS. 2 and 3, the coupling 10 has four shoes 32 positioned around the inside surface 36 of the thermoplastic pipe. The shoes 32 have a contoured, saddle portion 38 having a curvature that is coincident with the curvature of the inside surface 36 of the pipe when the end segments 22 and 24 are flared against the inside flaring 37 of each cuff, 17 and 18, as shown in the cross sectional view in FIG. 2.

When the end segments 22 and 24 are inserted in the sleeve 16 the shoes 32 are positioned as shown in dotted line for the shoe 32a in FIG. 2. On tightening of the adjustment screw 20 the saddle-portion 38 is drawn against the inside surface 36 of the end segments 22 and 24 drawing the end segments against the inside flaring 37 of the sleeve 16. On tightening of the adjustment screws 20, the shoes 32 compress the end segments 22 and 24 against the sleeve 16 to provide an internal sealing of the pipe and coupling 10.

To improve the sealing and the grip between the compression shoes 32 and the sleeve 16, the contact surface 42 of the shoes 32 and the contact surface 44 of the flaring 37 in the sleeve 16 include a saw-tooth grooving. The deformable pipe conforms to the saw-tooth grooves 50 to both improve the sealing and prevent the segments of pipe 12 and 14 from being dislodged from the coupling 10. In FIG. 3, the segment of pipe 14 is shown installed into the sleeve 16 prior to being drawn against the grooved contact surface 44 of the sleeve 16. The contoured shoe 32b, shown in dotted line in FIG. 3, illustrates the position of the shoes when the adjustment screw has been tightened and the end segment 24 of the pipe 14 has been drawn against the flaring 37 in the cuff portions 17 and 18 of the sleeve 16.

In FIGS. 1–3, a pipe has been shown with a slip-on compression coupling 10 that is designed for an eight inch thermoplastic pipe. For such diameter it is preferred that the coupling include four shoes for ensuring a sealing contact between the flared pipe and the coupling. However, for small diameter pipe, two or three contoured shoes may be sufficient to provide sealing. Similarly, for larger size pipe, for example twenty-four inch pipe, the number of shoes is correspondingly increased to sixteen to twenty. It is to be understood that the shoes are designed to fit within the inside of the pipe prior to deformation.

The neck portion 30 of the shoes 32 includes internal threading for threadable engagement with the screw 20. The neck portion 30 also includes web segments 52 which enter an internal channel 54 in the ridge 18 of the sleeve 16. This arrangement prevents the shoes from twisting or becoming disoriented during installation of the pipe and tightening of the screws.

To facilitate installation, the cuff portions 17 and 18 of the sleeve 16 has an externally directed flaring 56 at the open ends 35 to present an inside diameter to the sleeve that is slightly larger than the outside diameter of the pipe.

Between the internally directed flarings 37 and the externally directed flarings 56 is a cylindrical section 58 that is only marginally larger than the pipe allowing the pipe to slip into the cuff of the sleeve. Typically, the coupling 10 is fitted on one end of a pipe segment and positioned proximate the end of the opposite segment. The opposite segment is pulled toward the coupling manually or mechanically to insert the end into the open coupling until the end, as noted contacts the neck 30 and flaring 52 of the shoe. Proper positioning can be determined by marking the end of the pipe segment the distance that must be inserted. Without proper insertion, the shoes 32 will not contact a sufficient portion of the end segments of the pipe to insure sealing and prevent dislodgment. The sleeve as noted is dimensioned to encompass the outside dimension of the pipe. Since the curvature of the saddle portion of the shoes is dependent on the inside diameter of the pipe, substitute shoes may be required to accommodate deformable pipe that is not of a typical or standard wall thickness.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A coupling for interconnecting the ends of thermoplastic pipe having an inside circumference and an outside circumference comprising:
   a sleeve having an inside and an outside and, opposite open ends, the sleeve being dimensioned to encompass the outside circumference of the pipe, wherein the ends of the pipe are insertable into the opposite open ends of the sleeve,
   a plurality of compression shoes each shoe having an adjustment screw, wherein each shoe engages the ends of thermoplastic pipe inserted into the ends of the sleeve and wherein the adjustment screws project from outside of the sleeve, and on tightening, the shoes contact the inside circumference of the pipe and clamp the ends of the pipe against the inside of the sleeve, wherein the sleeve has cuff portions with a flaring internally directed from the opposite open ends, wherein the ends of the pipe flare against the flaring of the cuff portions in the sleeve on clamping with the compression shoes, wherein the cuff portions of the sleeve have an additional flaring outwardly directed toward the opposite ends openings.

2. The coupling of claim 1 wherein the sleeve has a projecting ridge centrally located around the outside circumference of the sleeve wherein the adjustment screws are seated on the circumferential ridge.

3. The coupling of claim 2 wherein the shoes have means cooperating with the circumferential ridge for preventing the shoes from twisting on tightening of the adjustment screws.

4. A coupling for interconnecting the ends of thermoplastic pipe having an inside circumference and an outside circumference comprising:
   a sleeve having an inside and an outside and, opposite open ends, the sleeve being dimensioned to encompass the outside circumference of the pipe, wherein the ends of the pipe are insertable into the opposite open ends of the sleeve,
   a plurality of compression shoes each shoe having an adjustment screw, wherein each shoe engages the ends of thermoplastic pipe inserted into the ends of the sleeve and wherein the adjustment screws project from outside of the sleeve, and on tightening, the shoes contact the inside circumference of the pipe and clamp the ends of the pipe against the inside of the sleeve, wherein the sleeve has a projecting ridge centrally located around the outside circumference of the sleeve, wherein the adjustment screws are seated on the circumferential ridge.

5. The coupling of claim 4 wherein the ridge forms an internal channel in the sleeve, wherein the shoes have a neck portion with web segments that enter the channel, wherein the shoes are prevented from twisting on tightening of the adjustment screws.

6. The coupling of claim 4 including, gasket washers wherein the gasket washers are seated on the ridge and engaged by the adjustment screws.

7. A coupling for interconnecting the ends of thermoplastic pipe having an inside circumference and an outside circumference comprising:
   a sleeve having an inside and an outside and, opposite open ends, the sleeve being dimensioned to encompass the outside circumference of the pipe, wherein the ends of the pipe are insertable into the opposite open ends of the sleeve,
   a plurality of compression shoes each shoe having a single, centrally positioned adjustment screw, wherein each shoe engages the ends of thermoplastic pipe inserted into the ends of the sleeve and wherein the adjustment screws project from outside of the sleeve, and on tightening, the shoes contact the inside circumference of the pipe and clamp the ends of the pipe against the inside of the sleeve wherein the sleeve has cuff portions with a flaring internally directed from the opposite open ends, wherein the ends of the pipe flare against the flaring of the cuff portions in the sleeve on clamping with the compression shoes wherein the shoes have a contoured saddle portion with a curvature that is coincident with the inside circumference of the ends of the pipe when flared against the flaring of the cuff portions of the sleeve.

8. The coupling of claim 7 wherein the shoes are contoured to maintain the effective internal diameter of the pipe when connected by the coupling with the adjustment screws tightened and the ends of the pipe flared against the internally directed flaring.

9. The coupling of claim 7 wherein the shoes have a contact surface that contacts the ends of the thermoplastic pipe when the pipe is connected by the coupling, the contact surface of the shoes and the internally directed flaring of the sleeve having grooves to improve sealing and gripping by the sleeve and shoes.

* * * * *